United States Patent Office 3,751,328
Patented Aug. 7, 1973

3,751,328
CORRUGATED POLYETHYLENE TEREPHTHALATE FILM AND PREPARATION THEREOF
Walter L. Roberts, Hickory, and Paul F. Burch, Conover, N.C., assignors to Superior Cable Corporation, Hickory, N.C.
No Drawing. Filed Oct. 13, 1965, Ser. No. 495,718
Int. Cl. B31f 1/20; B32b 3/28
U.S. Cl. 161—133    8 Claims

ABSTRACT OF THE DISCLOSURE

Corrugated polyethylene terephthalate film is provided having a coefficient of friction of less than about 0.40. Before corrugation, the film may be biaxially oriented and heat set at a temperature of 180° to 220 C. and with the thickness being less than about 10 mils, preferably 1-3 mils. The corrugation can be accomplished by shaping at 100° to 175° C. (preferably, 120° to 140° C.) between coacting roating surfaces, preferably maintained at the same temperature. The coefficient of friction is preferably reduced to below 0.35.

---

This invention relates to corrugated polyethylene terephthalate film. More particularly, this invention is directed to corrugated polyethylene terephthalate film having enhanced surface characteristics and improved handling properties.

Corrugated polyethylene terephthalate film and its use as a protective barrier for the conductor core of an insulated electric cable are disclosed in copending U.S. patent application Ser. No. 269,944 filed Apr. 2, 1963, allowed Aug. 20, 1965, now U.S. Pat. 3,244,799, and assigned to Superior Cable Corporation of Hickory, N.C. The entire disclosure of that application is hereby incorporated by reference.

In the production and use of such corrugated film, a serious handling problem has been noted. In winding up the corrugated film to obtain a roll for storage, shipment or use, it is observed that the longitudinal grooves, i.e. alternating peaks and valleys, do not nest evenly and uniformly, with resultant poor roll formation. The roll frequently has one or more undesired characteristics such as uneven roll diameter, lateral telescoping of the various layers, lateral displacement of occasional layers, film cracking due to uneven winding, etc.

Furthermore, when such corrugated film is used for some purposes, such as the core wrapping of telephone cable, such film tends to lack uniformity in nesting and interfitting with itself as the film is spirally wrapped upon itself in partially overlapping fashion at the winding head of the automatic winding apparatus.

According to the present invention, the above problems are significantly reduced or eliminated by providing such corrugated film having a surface with a coefficient of friction of less than about 0.40 and preferably less than about 0.35 as measured by the Bell test, a test procedure developed by the Bell Telephone Laboratories and described in available publications. The test is conveniently carried out using a Frictionometer, Model CS–131, designed by Bell for this purpose and manufactured by Custom Scientific Industries, Inc., in accordance with the Bell design.

By contrast with the friction coefficient below 0.40 found necessary for the improvement, regular untreated corrugated polyethylene terephthalate film typically has a coefficient of friction of as high as 0.80 and higher when measured by the same test.

It is surprising that reducing the coefficient of friction of the film, as is done in practicing the present invention, reduces lateral slippage of the film upon windup since ordinarily films having relatively low coefficients generally have a greater tendency to lateral slippage than those of relatively high coefficients.

Corrugated polyethylene terephthalate films having the enhanced frictional characteristics according to this invention can be produced by any of a variety of methods. Treatment of course will be sufficient to give a film having the coefficient below the specified value of 0.40.

According to one method, the film can be internally sized by the inclusion in the film polymer, prior to film formation, of one or more fillers or additives suited for increasing surface roughness of the film and therefore decreasing the film's coefficient of friction. Illustrative of such fillers can be mentioned calcium carbonate, mica, silica, calcium silicate, glass, clay, carbon black, talc, titanium dioxide, etc.

In another method, the film can be mechanically treated on its surface at the corrugating step or subsequent thereto by any of a wide variety of treatments, including but not limited to pressing with a rough-surfaced corrugating wheel or wheels, embossing, burnishing, polishing, scrubbing, blasting as with sand, or the like.

In still another method, the film following corrugation has applied to it a chemical agent such as a suitable lubricant in an amount sufficient to reduce the coefficient of friction below the specified value. Any suitable treating agent can be used which is compatible with the film and its intended use and which will result in the desired coefficient of friction.

Illustrative of suitable chemical agents can be mentioned glycols including ethylene glycol, diethylene glycol, glycerol, sodium glycolate, etc.; soaps including fatty acid stearates, oleates, etc., and salts such as alkali metal and alkaline earth metal salts; silicones including silicone sprays and oils; hydrocarbon oils; perfluorocarbon particles; and the like. A particularly suitable material is identified as CRC–2–26 available from Corrosion Reaction Consultants, Inc., and containing methyl salicylate, triglycerol ester fatty acid and hydrocarbon oil in trichloroethylene.

The chemical treating agent can be applied to the corrugated film by any convenient means such as dipping or immersion in a bath, coating rollers, dusting, sponge, spray such as a pneumatic spray system, etc.

The treatment of the film by any of the above three methods, or other suitable method, should not substantially change the dielectric characteristics of the film when such characteristics are important for the intended use of the film. It is also highly desirable for convenience and economic reasons, but not essential for achieving the desirable result described herein, to avoid the use of fillers and treating agents which are not readily susceptible to recovery, as in recycle or film scrap recovery operations frequently utilized in a commercial scale operation.

Although the film can be treated to enhance its surface by any of the above methods in a batch operation, the treatment is most usefully, most effectively, and most conveniently carried out in a continuous operation involving the continuous corrugation of the film.

In one such exemplary continuous process, the starting film is a polyethylene terephthalate film which has been formed by melt extrusion; biaxially oriented by biaxially stretching an amount of from about 2 to 6 times, and preferably on the order of about 3 times, in each dimension; and heat set at a temperature in the range of about 180°–220° C. The film will ordinarily be about 0.5–10 mils in thickness, usually less than 5 mils, and preferably 1–3 mils thick. Such film known by the trademark "Mylar" polyester film is available from E. I. du Pont de Nemours & Co., Wilmington, Del.

The film just described is pre-heated prior to corrugating by over-and-under contact with one or more of a series of internally heated rollers or drums. The heated film is then led partially around and between a pair of interfitting, meshing, corrugating wheels which coact to press the heated film into the desired longitudinally-grooved, laterally-waved, corrugated shape.

Film temperature prior to corrugation will be in the range of 100°–175° C. and preferably in the range of 120°–140° C.

In an important aspect, it has been noted that maintenance of both corrugating rollers during the corrugation operation at substantially the same temperature, i.e. plus or minus about 2°, results in a final product having greater reduced pinhole formation and a significantly reduced amount of longitudinal wrinkling.

The corrugating wheels are cooler than the film and can conveniently be cooled by circulating tap water. Film temperature leaving the corrugating wheels will ordinarily be below about 100° C., say 50°–85° C.

Particular advantages are obtained when the surface speed of the corrugating wheels is somewhat (on the order of 0.2 to 5 or 10%) greater than the film speed as the film leaves the last of the pre-heat rollers to provide longitudinal tension on the film at that point. For example, in corrugating polyethylene terephthalate film 2 mils thick and 3 mils thick, the corrugating wheels' surface speed will usefully be 0.5% and 3.0%, respectively, faster than the film speed at the last pre-heat roller.

Corrugations put into the film by the corrugation operation will for most uses be in the range of about 20 to 40, and preferably about 32, per inch. In one run a starting film of 3 mils thick, with a film temperature of 130° C. just prior to contacting the first corrugating wheel, a temperature of 68° C. upon leaving the wheels where 32 corrugations per inch were formed, gave a corrugated product having a peak to valley overall height on the order of about 9.5 mils. Film speed leaving the corrugating rollers is about 220 feet per minute.

In one example according to this invention, following corrugation of a 3 mil film and before windup the lower surface of the corrugated film is sprayed with an amount of the CRC–2–26 lubricant referred to above sufficient to leave, upon evaporation of the solvent a solids residue on the surface of the film of about 0.46 gram per square meter of film. When tested for coefficient of friction using the Bell test, the product was found to have a coefficient of friction of 0.25 and showed very satisfactory roll formation.

When this operation was repeated using a 2 mil film and the amount of treating agent was sufficient to provide a surface deposit of 0.32 gram per square meter, the resulting coefficient of friction as determined by the Bell test was 0.29. In this latter operation, the film speed was 400 feet per minute.

Amounts of the CRC–2–26 agent to provide as low as 0.15–0.30 gram per square meter of solids effect definite improvement in the corrugated product. Amounts above 0.50 or even 1.00 gram can be used but with economic penalty.

Following corrugation and treatment of the film, it can be wrapped for storage, shipment or use in other operations.

The teachings herein are directed for convenience primarily to polyethylene terephthalate films but it will be readily understood that the invention is applicable to other linear terephthalate polyesters and other equivalent materials. Examples of other suitable polyesters appear in Kitson & Reese United States Patent No. 2,952,879 issued Sept. 20, 1960.

The Bell Telephone Laboratories test for the determination of coefficient of friction is described and full details of the equipment and method of test given in the article entitled "A Variable Speed Frictionometer for Plastics, Rubbers, Metals and Other Materials" by R. F. Westover and W. I. Vroom, published by the American Society of Mechanical Engineers as Paper No. 62–WA–321, November 1962. The film-to-film coefficients of friction reported in this application are static coefficients as defined by Westover and Vroom, and were determined using a fixed film sample width of about ⅛ inch, a film running speed of approximately 0.6 cm./sec., a pendulum moment of 1000 grams and a normal force of 50 grams. Fixed and moving film samples were aligned with the peaks of one positioned in the valleys of the other.

The invention claimed is:

1. Corrugated polyethylene terephthalate film having a surface coefficient of friction of less than about 0.40 as determined by the Bell test.

2. Film as in claim 1 which, prior to corrugation, had been biaxially oriented from about 2 to 6 times its original dimensions and heat set at a temperature in the range of 180° to 220° C.

3. Film as in claim 1 having from about 20 to 40 corrugations per inch.

4. Film as in claim 1 having a thickness prior to corrugation of less than about 10 mils.

5. The method of corrugating polyethylene terephthalate film which comprises shaping said film at a temperature in the range of about 100° to 175° C. by pressing said film between two coacting rotating surfaces and reducing the coefficient of friction of the resulting film to below about 0.40 as determined by the Bell test.

6. The method as in claim 5 wherein said temperature is in the range of 120°–140° C.

7. The method as in claim 5 wherein said rotating surfaces are maintained at substantially the same temperature as each other.

8. The method as in claim 5 wherein said reducing of coefficient of friction is by spraying a lubricant on the corrugated film surface.

References Cited

UNITED STATES PATENTS

| | | | |
|---|---|---|---|
| 2,650,213 | 8/1953 | Hofrichter | 161—Alkyd |
| 2,836,528 | 5/1968 | Ford | 161—Alkyd |
| 3,071,180 | 1/1963 | Finger et al. | 161—Alkyd |
| 3,244,799 | 4/1966 | Roberts | 161—Corrugate |

FOREIGN PATENTS

| | | | |
|---|---|---|---|
| 161,646 | 6/1953 | Australia | 161—Alkyd |

MORRIS SUSSMAN, Primary Examiner

U.S. Cl. X.R.

156—210; 264—286; 117—104